United States Patent [19]

Norris

[11] Patent Number: 4,632,835
[45] Date of Patent: Dec. 30, 1986

[54] FRUIT WAX DRYING PROCESS

[76] Inventor: James X. Norris, 507 Harris Ave., Selah, Wash. 98942

[21] Appl. No.: 575,419

[22] Filed: Jan. 30, 1984

[51] Int. Cl.$^4$ .............................................. A23B 7/16
[52] U.S. Cl. .................................. 426/302; 426/102; 99/483; 99/517
[58] Field of Search ............... 426/305, 465, 302, 102

[56] References Cited

U.S. PATENT DOCUMENTS

| | | | |
|---|---|---|---|
| 1,050,151 | 1/1913 | Loomis | 34/77 |
| 1,446,054 | 2/1923 | Maus | 34/77 |
| 1,585,370 | 5/1926 | Brogden | 426/305 |
| 1,692,286 | 11/1928 | Brogden | 426/305 |
| 1,900,295 | 3/1933 | McDill | 426/305 |
| 1,932,124 | 10/1933 | Tobey | 34/217 |
| 3,217,421 | 11/1965 | Lowe et al. | 34/217 |
| 3,393,532 | 7/1968 | Khoylian | 34/217 |
| 4,291,472 | 9/1981 | Lewis | 426/305 |
| 4,352,249 | 10/1982 | Rose | 426/305 |

OTHER PUBLICATIONS

Smock and Neubert 1950 Apples and Apple Products, Interscience Publishers, New York, pp. 186–203.
Rostos, 1960, A Survey of Fruit Cool Stores, Bulletin 282, CSIRO, Australia, pp. 6–13.
Powell and Fulton 1905, The Apple in Cold Storage, USDA Bulletin 48, pp. 12–15.
Chemical Engineers' Handbook, Robert H. Perry and Cecil H. Chilton, Fifth Edition (1973), McGraw-Hill Book Company, pp. 20–25 and 20–27 only.

Primary Examiner—Raymond N. Jones
Assistant Examiner—Carolyn Paden
Attorney, Agent, or Firm—Seed and Berry

[57] ABSTRACT

The invention relates to method and process for drying aqueous coatings such as water based wax and the like on fruit.

The fruit is taken from the cold storage area and immersed in heated water to raise the skin temperature to a level sufficient to be receptive to the coating. The coating is then applied to the fruit. Cold air, above the freezing temperature, is passed first up through the product, over it and down through it while it is carried on a porous conveyor. The cold air, heated by the warmer product and laden with water and solvents, is passed through a refrigeration unit. The water carrying the solvents is then removed. The dehumidified air is then recycled. The product may be exposed to a second sequential stream of cold air.

13 Claims, 2 Drawing Figures

FRUIT WAX DRYING PROCESS

BACKGROUND OF THE INVENTION

Fruits, such as apples and citrus fruit, are commonly treated with an aqueous coating of wax material, or the like. The coating is designed to protect the fruit, reduce moisture, transfer and enhance the appearance of the fruit.

Fruit, such as apples, are commonly stored at temperatures near freezing prior to the application of the wax.

SUMMARY OF THE INVENTION

The invention relates to method and process for drying aqueous coatings and the like on products such fruit. The process and apparatus are most advantageously used in connection with the processing of apples. The process and apparatus will be described in terms of this particular application wherein the aqueous coating is a water based wax.

In the utilization of the process, the apples are taken from the cold storage area and immersed in heated water. The heated water is used to raise the skin temperature of the fruit to a level sufficient to be receptive to the coating material. At this stage the fruit is commonly washed of surface dirt and other impurities and then it is rinsed. The excess water is removed from the surface of the fruit, such as by a mechanical brushing action. At this point the water based wax or other coating is applied to the fruit. This is typically done by spraying or brushing water based wax on the fruit. At this point, the inventor's process differs from the previous conventional processes in that cold air, above the freezing temperature, is passed first up through a product carrying conveyor and about the product over the top of the conveyor and product, and then down through the conveyor and about the product. As the cold air is heated by contact with relatively warm product it absorbs the excess water and associated solvents curing the wax. After the cold air passes about the product and becomes laden with water and solvents it is passed through a refrigeration coil to condense the water and solvents. The condensed water carrying the solvents is then removed. The cold, dehumidified air is then recycled.

The product may be exposed to a second sequential stream of cold air passing about the fruit and then through a refrigeration unit in a similar manner.

The apparatus includes an enclosure which has an opening for the entry of the apples and a discharge opening for the apples. A conveyor extends from the entrance to the discharge. The conveyor is porous and adapted to carry the apples in a spaced relationship to each other, forming a perforate zone for the passage of air. A baffle extends below the conveyor to limit air flow along the conveyor. The baffle has an opening in which the blower is mounted. Baffles are provided to direct the air discharged from the blower up through the conveyor, along the conveyor and about the fruit and down through the conveyor. The air then returns to the blower section and is recycled. A cooling apparatus is provided in the air stream to condense the solvents and water from the air stream. Additional blower, baffle and cooling units may be provided to sequentially treat the fruit at several point along the conveyor.

DETAILED DESCRIPTION OF THE INVENTION

The invention relates to a process for drying wax, similar aqueous materials, or other coatings in a liquid vehicle placed on the surface of fruit, such as apples or citrus fruit or other products.

In a typical application of the process to fruit, the fruit is taken from a cold storage area and immersed in heated water. The heated water is used to raise the skin temperature of the fruit to a level sufficient to be receptive to the coating material. At this stage the fruit is commonly washed to remove surface dirt and other impurities and then it is rinsed. Water is then removed from the surface of the fruit such as by the use of a mechanical brushing action. At this point the water based wax or other coating is applied to the fruit. This is typically done by spraying or brushing water based wax on the fruit.

In the inventor's process at this stage cold air, above freezing temperature, is passed first up through the product, over it, and down through the product while it is carried on a porous conveyor. As the cold air is heated by contact with the relatively warm product it absorbs the excess water and associated solvents, curing the wax or coating.

After the air, which is passed over, through, and around the product, becomes laden with water and solvents it is passed through a refrigeration coil to condense the water and solvents. The condensed water carrying the solvents is then removed. The dehumidified air is then recycled.

Preferably the product is exposed to a second sequential stream of cold air passing over and around the product to further remove moisture and cure the coating.

The product is then typically returned to cold storage; the skin temperature of the product having been lowered by the cold dehumidified air.

Figure 1:
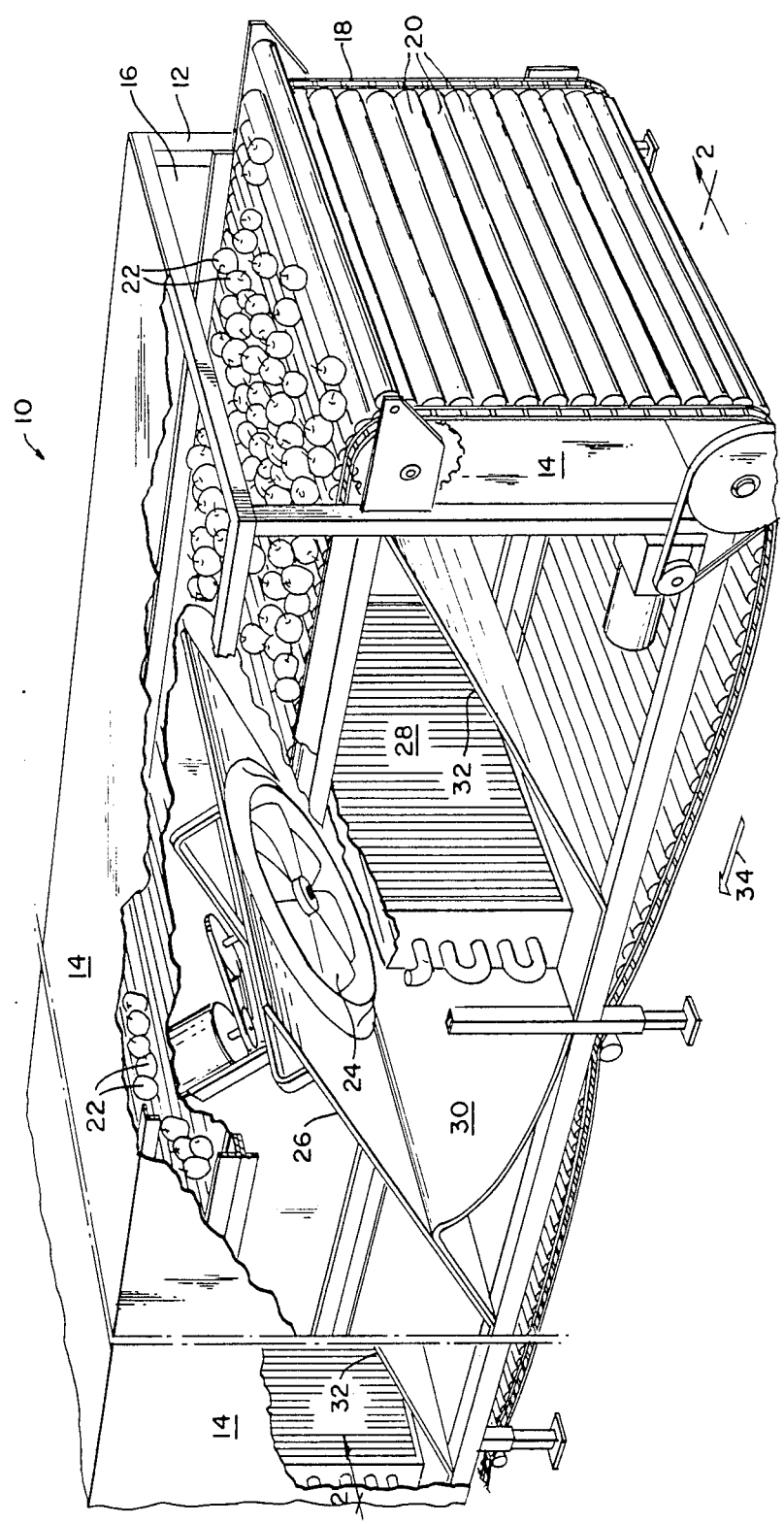
FIG. 1 is a partial, perspective view of an apparatus for use in connection with the fruit wax drying process with portions of the structure broken away to show details.

FIG. 1 illustrates a dryer tunnel 10 for use in connection with carrying out the above described process. The tunnel is provided with a rigid frame consisting of welded or bolted steel tubing, angle and channel. Enclosing bottom, top, side and end walls of galvanized sheet steel are provided. The interior surfaces of the walls are insulated with sheet insulation. A discharge opening is provided at one end of the dryer tunnel. An entrance opening in the corresponding position is provided at the other end of the tunnel. An air barrier is provided at the entrance and discharge openings to permit passage of the fruit but minimize air transfer in or out of the dryer tunnel. A barrier consisting of numerous depending strips of flexible material may be used.

The fruit is transported, such as through the use of the continuous roller conveyor 18. The rollers 20 on the conveyor are preferably made of 1½ inch diameter galvanized electrical conduit or the like. The rollers are preferably spaced 3½ inches apart from centerline to centerline. This provides an approximate one inch space between the rollers for the passage of air. The conveyor transports the fruit 22 from the entrance end to the discharge end of the dryer tunnel.

In a typical installation having two sequential cold air processing units for use in connection with the processing of apples, a tunnel would normally extend thirty feet long, four to six feet wide and approximately six feet high. Tunnels would commonly range from twenty to forty feet in length. The conveyor travel rate would preferably range from ten to twenty feet per minute with a speed of approximately fifteen feet per minute being preferred.

Figure 2:
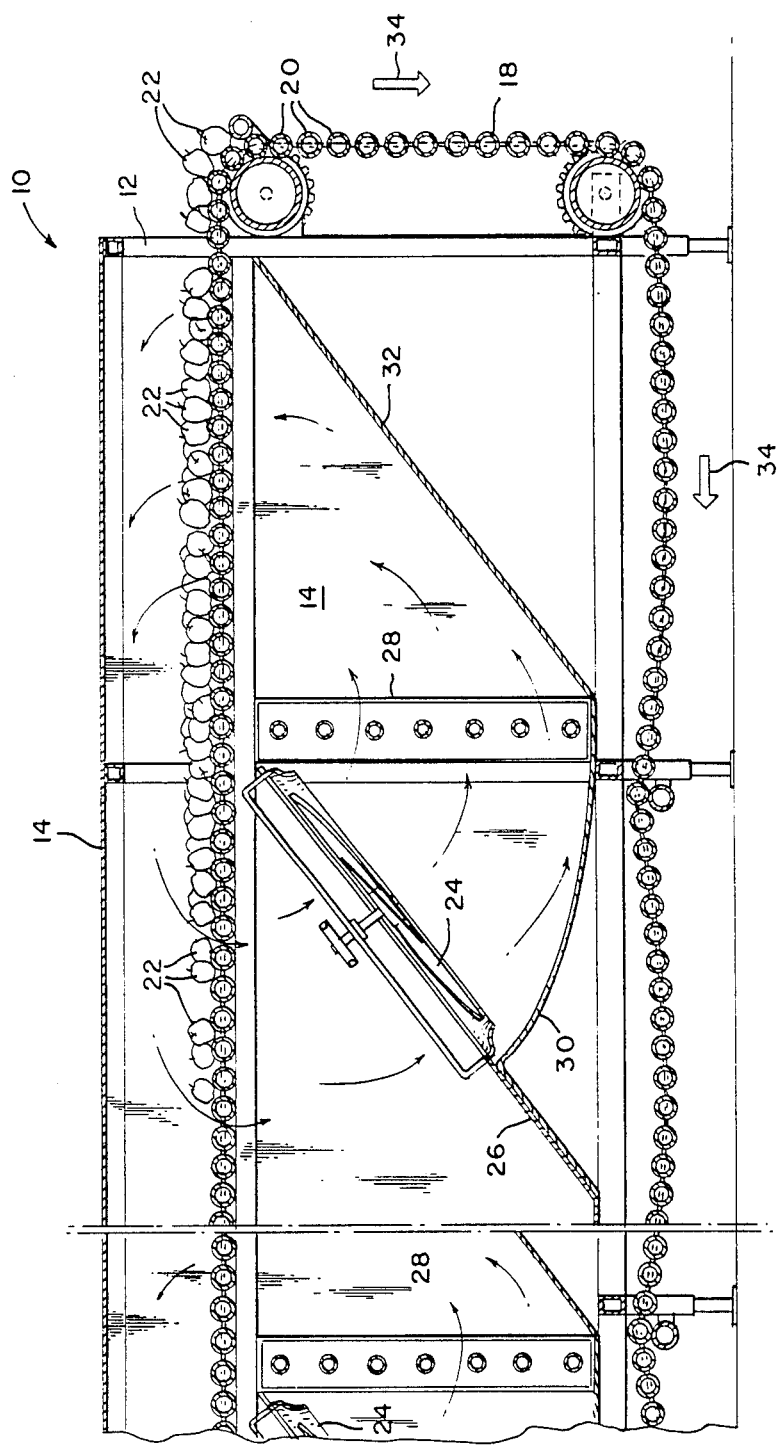
FIG. 2 is a transverse section view of the dryer tunnel shown in FIG. 1.

Referring to FIG. 2, a blower 24 is positioned beneath the upper run of the conveyor as shown in the drawing. Preferably the fan is mounted in an opening in a baffle which extends from the bottom of the enclosure to just beneath the top run of the conveyor and from side wall to side wall. The baffle is sloped when viewed from the side. The blower pulls air, as shown by the arrows in FIG. 2, through the top run of the conveyor and forces it through a cooling unit 28. The cooling unit is preferably a set of refrigerated freon, evaporator coils. A drain of the conventional type is provided in the base of the cooling unit to carry away moisture which condenses and falls from the coils.

A baffle 30 is provided below the blower discharge and serves to direct the air drawn through the conveyor and product into the cooling unit. Another baffle 32 is placed downstream from the cooling unit and serves to direct the cooled and dehumidified air upward through the downstream section 32 of the roller conveyor.

As can be seen from the drawing, while the roller conveyor moves in the direction of the arrows 34 cold air passes up through the product. The air is warmed by the product and the conveyor rollers. The air picks up moisture from the coating and cures the coating, and then travels counter to the flow of the product on the conveyor picking up additional moisture and curing the coating applied to the product. The air then travels down through the product upstream from where it entered. The air then passes through the product and conveyor and into the suction side of the blower. The air discharged from the blower travels through the cooling unit where the moisture is condensed on the coils and removed from the air stream.

The dryer tunnel is preferably constructed so that there are two sequentially operating cold air processing units within a single enclosure. The cold air processing units are identical in operations and structure. No curtains or baffles are required between the spaced cold air processing units. Anywhere from one to four or more cold air processing units may be placed in a single enclosure as needed.

In an application where the above described dryer is used in connection with the processing of apples the blowers are sized so that the air flow ranges between 8,000 to 9,000 cubic feet per minute depending on the back pressure. The back pressure depends on the size of the apples being processed. In such a system approximately 250 bins of apples can be processed in an eight hour shift with the conveyor traveling at fifteen feet per minute. Each bin carries approximately 900 pounds of apples. A three horse power drive for each blower was adequate for each blower in the two cooling unit example described herein.

In a typical example using the above described equipment in the preferred embodiment for processing apples, the system would operate as described below.

The apples prior to processing are stored at a temperature ranging from 32° to 34°. All temperatures described herein are in degrees Fahrenheit. The apples are removed from bins by immersion of the bins in a water flume. The water is heated and ranges from 60° to 80°. This is done to raise the skin temperature of the apple to accept the aqueous wax solution. The apples then float in the flume to a conveyor which carries them out of the water and onto a roller conveyor. The apples are then washed in a conventional manner with water ranging in temperature from 60° to 80°. The apples are then carried on a conveyor to a rinsing station. At the rinsing station the apples are rinsed in a conventional manner, such as by a water shower, with water ranging in temperature from 80° to 100°. The apples are then carried to brush rollers to remove excess water from the surface of the apple. The apples at this point have a skin temperature ranging between 55° and 65°. At this point there is a fine water film surrounding the apple. The apples are then carried to a point where water based wax is applied to the apples by spraying. The apples are then carried on a conveyor to the entrance of the dryer tunnel. The dryer tunnel utilized conveys the apples at fifteen feet per minute through the tunnel. The cooling coils are run with a 25° suction gas evaporation temperature. The solvent in the wax prevents the moisture from freezing on the coils. Air leaves the cooling coils from between 33° to 35° and travels around the apples which have an entering skin temperature ranging between 55° to 60°. The air temperature rises allowing it to absorb moisture out of the wax. The wax dries as the water and solvents leave the surface of the apples. The air is then returned to the coils and once again cooled. The moisture which condenses on the coils is drained off. The apples then proceed in the conveyor through the second sequential cold air processing unit. The apples then are discharged from the drying tunnel, loaded into boxes, and returned to cold storage.

The above described process and apparatus have the advantages that no propane, natural gas, or electric heat is needed like in the conventionally used drying tunnels. The energy utilization of of this process and equipment is about 10% of that utilized in the process equipment where hot air is used to dry the wax or other coating. Cold air is utilized to dry the wax or other coating rather than warm air. Fruit and other product quality is maintained by keeping the temperature of the fruit or other product down. The same air that impinges on the product is recirculated for improved economy of operation. The fruit or other product is also packed cooler so that less energy is required in cooling the fruit or other product back down in cold storage. Waste heat created in the refrigeration process can be used for heating the water used in the earlier stages of the fruit or other product waxing processes or as processing area space heat. The process and equipment provide for a more uniform wax cure.

I claim:

1. A method of drying volatile liquid solvent containing wax-base coatings on fruit, comprising the steps of:
   a. providing a substantially closed chamber having a conveyor path of selected width along which said fruit, to which said coating has been applied in a liquid form, is advanced;
   b. transporting said fruit carrying said liquid coating and in a spaced relationship to each other through the chamber along the conveyor path;

c. cooling a drying gas to a temperature below that of said fruit; and d. directing a stream of said cooled gas within the chamber onto said fruit, thereby causing evaporation of said liquid solvents from said coating.

2. A method of drying wax-base coatings on fruit, as claimed in claim 1, further comprising the steps of:

a. cooling the stream of gas which has passed over said fruit to condense said evaporated solvents;

b. removing said condensed solvents from said gas stream by passing said gas through a cooling unit including condenser surfaces; and c. recycling said cooled gas onto said fruit, causing evaporation of moisture from said coatings.

3. A method of drying aqueous coatings of wax or the like on apples, as claimed in claim 2, further including the step of recycling the dehumidified gas by redirecting the dehumidified gas stream to the apples to cause evaporation of additional moisture.

4. A method of drying wax-base coatings on fruit, as claimed in claim 2, further comprising the step of:

directing a second, separate stream of cold gas sequentially along the conveyor, onto said fruit within the chamber to substantially complete evaporation of said liquid solvents from said coating.

5. A method of drying wax-base coatings on fruit, as claimed in claim 4, further comprising:

a. cooling the second stream of gas which has passed over the fruit to condense the evaporated liquids; and b. removing the condensate obtained from the second stream of gas.

6. A method of drying aqueous wax-base coatings containing water and solvent vehicles on fruit which has a warm outer surface, comprising:

a. providing a substantially closed chamber having a conveyor path of a selected width along which said fruit having a warm outer surface is advanced;

b. transporting the fruit carrying the liquid coating and in a spaced relationship to each other through the chamber along the conveyor path; and c. directing a stream of cold air within the chamber, said air near freezing temperature and below that of said fruit, onto said fruit at a selected flow rate to pass about said fruit to cause evaporation of said liquid vehicles from said coating.

7. The method of claim 6 wherein said fruit at coating has a skin temperature of about 55°–65° F. and said cold air is cooled to about 33°–35° F. prior to being directed onto said fruit.

8. The method of claim 7 wherein said fruit is an apple.

9. A method of drying volatile liquid solvent and moisture containing wax-base coatings on fruit, including the steps of:

a. transporting said coated fruit on a conveyor through an enclosed chamber;

b. cooling a drying gas to a temperature below that of said fruit; and c. contacting the fruit in the chamber on the conveyor with said drying gas, whereby said solvents and moisture content evaporate from said coating on said fruit, wherein said coating is dried substantially completely.

10. The method of claim 9 wherein said liquid coating includes a water and a volatile organic solvents vehicle.

11. The method of claim 9 wherein said coating is applied to apples from cold storage, including the further steps of:

a. washing said apples prior to coating to achieve an apple skin condition and temperature receptive to adherence of said coating;

b. applying said aqueous wax-base coating to said apples;

c. cooling drying air below the skin temperature of said apples, wherein said air is dehumidified; and d. contacting said coated apples with said cooled dehumidified air, wherein said aqueous organic solvent vehicle is evaporated from said coating, which forms a dry coating on said apples.

12. The method of claim 11 wherein said apples have a skin temperature of about 55°–65° F. after washing, and said drying air is chilled to a temperature less than said apple skin temperature but above that which would freeze solvents on said apple skin surfaces.

13. The method of claim 12 wherein said drying air is chilled to about 33°–35° F. by contacting a cooling condenser surface at about 25° F.

* * * * *